(12) United States Patent
Weber et al.

(10) Patent No.: US 8,474,907 B2
(45) Date of Patent: Jul. 2, 2013

(54) CAR SEAT INSTALLATION AND RECLINE MECHANISM

(75) Inventors: Craig Weber, Philadelphia, PA (US);
Noah Dingler, Phoenixville, PA (US);
Troy Mason, Brownsburg, IN (US);
Brandon McKee, Reading, PA (US);
Matt Morgenstern, Coatesville, PA (US); Rachel Fine Praetorius, Berkeley, CA (US)

(73) Assignee: Graco Children's Products Inc., Atlanta, GA (US)

( * ) Notice: Subject to any disclaimer, the term of this patent is extended or adjusted under 35 U.S.C. 154(b) by 314 days.

(21) Appl. No.: 12/830,148

(22) Filed: Jul. 2, 2010

(65) Prior Publication Data

US 2011/0074194 A1 Mar. 31, 2011

Related U.S. Application Data

(60) Provisional application No. 61/223,049, filed on Jul. 5, 2009.

(51) Int. Cl.
*B60N 2/26* (2006.01)

(52) U.S. Cl.
USPC .............................. 297/256.16; 297/256.13

(58) Field of Classification Search
USPC ................... 297/256.1, 256.13, 256.16, 250.1
See application file for complete search history.

(56) References Cited

U.S. PATENT DOCUMENTS

| | | | |
|---|---|---|---|
| 6,428,099 B1 | | 8/2002 | Kain |
| 8,186,757 B2 * | | 5/2012 | Duncan et al. ........... 297/256.13 |
| 2005/0264062 A1 * | | 12/2005 | Longenecker et al. .... 297/250.1 |
| 2005/0264064 A1 | | 12/2005 | Hei et al. |
| 2006/0261650 A1 * | | 11/2006 | Billman et al. ............ 297/250.1 |
| 2007/0228788 A1 * | | 10/2007 | Meeker et al. ............. 297/250.1 |
| 2010/0207436 A1 * | | 8/2010 | Karremans et al. ...... 297/256.16 |
| 2011/0233978 A1 * | | 9/2011 | Clement et al. .......... 297/256.13 |

FOREIGN PATENT DOCUMENTS

| | | |
|---|---|---|
| EP | 1 493 616 | 1/2005 |
| EP | 1 761 142 | 3/2007 |

OTHER PUBLICATIONS

"King Plus"; Britax Römer Car Seat User Manual; 29 pages; (2008).
"Child Car Seats Safety Standards: ISOFIX", description of ISOFIX system; 1 page; from www.chidcarseats.org.uk (admitted prior art).
"What is ISOFIX?"; Britax Römer website; 2 pages; from www.britx-roemer.com (1997).

\* cited by examiner

*Primary Examiner* — David Dunn
*Assistant Examiner* — Timothy J Brindley
(74) *Attorney, Agent, or Firm* — Lempia Summerfield Katz LLC

(57) ABSTRACT

A car seat has a base for placement on a vehicle seat and a seat shell attachable to and detachable from the base. A latch mechanism is biased to a latched arrangement attaching the shell to the base. A release actuator is connected to the latch mechanism and can move the latch mechanism to a released arrangement, detaching the shell from the base permitting its removal from the base. The shell can be optionally adjustable on the base between at least two different recline positions. The latch mechanism in the latched arrangement can then also retain the shell in one of the recline positions. A recline actuator can be connected to the latch mechanism and can move the latch mechanism allowing adjustment of the shell recline position but not permitting removal from the base.

20 Claims, 12 Drawing Sheets

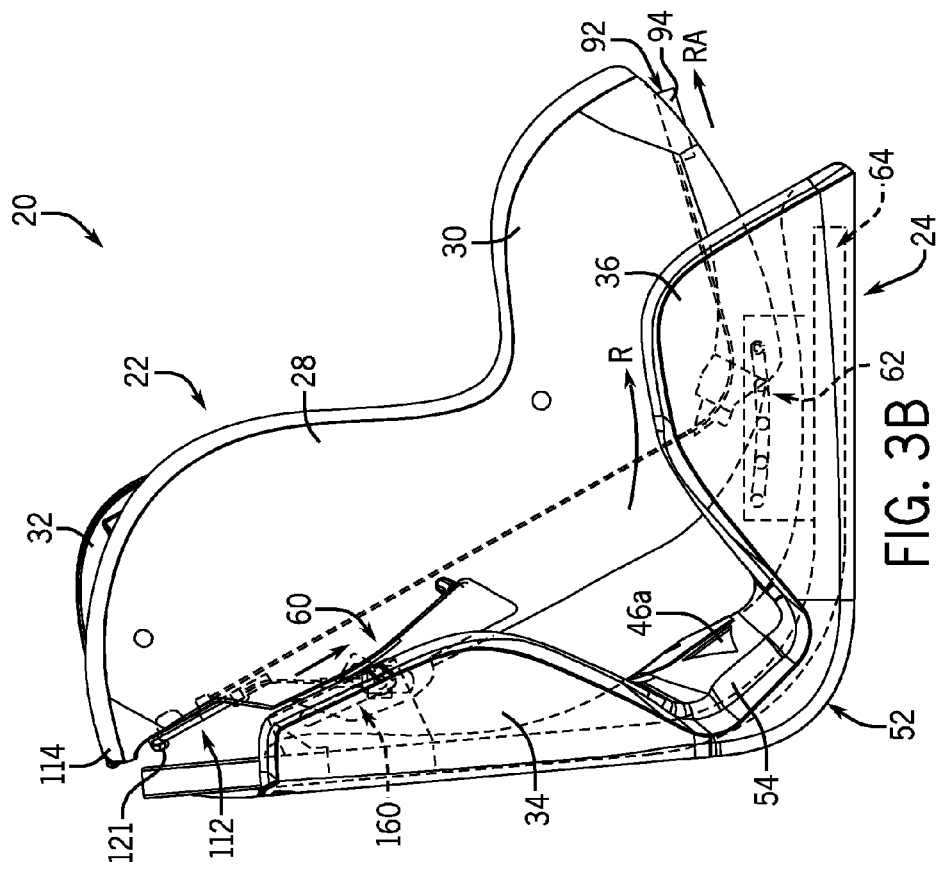
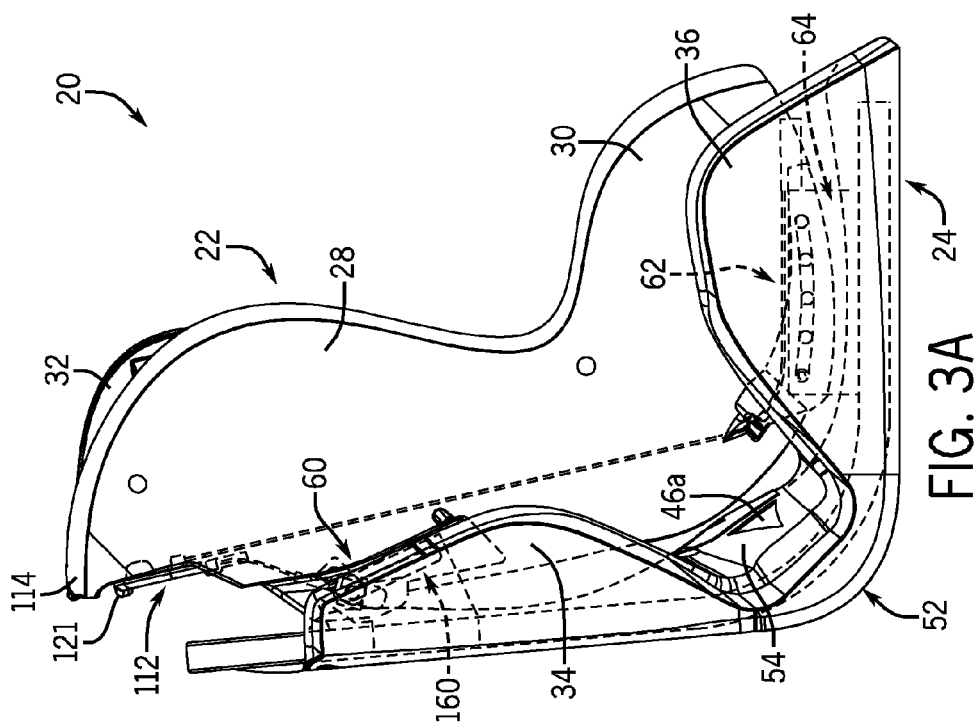

CAR SEAT INSTALLATION AND RECLINE MECHANISM

RELATED APPLICATION DATA

This patent is related to and claims priority benefit of U.S. provisional application Ser. No. 61/223,049 filed Jul. 5, 2009 and entitled "Car Seat Installation Mechanism and Method." The entire contents of the prior filed provisional application are hereby incorporated by reference herein.

BACKGROUND

1. Field of the Disclosure

The present disclosure is generally directed to safety seats or car seats for children, and more particularly to an installation mechanism and method for installing a car seat on a vehicle seat.

2. Description of Related Art

Parents and caregivers often have great difficulty properly installing a Group 1 car seat within a vehicle on the vehicle's seat using the vehicle's seat belt or safety harness system. The seat belt typically must be fished by the parent between the seat shell and base, or around the base in a complicated, difficult to ascertain belt path. This can often lead to erroneous installation of the car seat. The vehicle's seat belt can often be incorrectly routed or improperly tightened by the parent due to the complexity, inaccessibility, and/or inability to see or visualize the intended belt routing.

One attempted solution to resolve these difficulties was the introduction of an ISOFIX car seat. The ISOFIX seat provided rigid connectors on the car seat to connect to anchors in the vehicle near the vehicle's seat. This eliminated the need for a parent to route the vehicle's belt around the car seat when securing the car seat on the vehicle's seat. However, the ISOFIX car seat included additional parts adding cost to the car seat, which can be prohibitive and result in a parent deciding or being unable to purchase such a seat or system. Often, the parents attached the ISOFIX car seat with both the ISOFIX anchors and the vehicle's seat belt, negating any improved installation or ease of use or installation benefits. Also, ISOFIX car seats use either a load leg or a top tether. These add a degree of complexity to the installation process and thus increase the time and effort to install the seat.

Another known attempted solution to the above problems is known as the "Roemer King," which has a seat shell that flips forward during installation on a vehicle's seat to allow the user access to the base and the belt path. However, many consumers do not trust that the seat shell will not rotate forward during a crash. Thus, consumer confidence in such a solution has not been satisfactory. In addition, the car seat cannot be flipped very far forward in smaller cars. This can prevent the user from reaping the benefit of the car seat during installation. The car seat cannot be moved completely out of the way for installing the base on the vehicle seat.

U.S. Pat. No. 6,428,099 to Cosco discloses a seat with a shell that is removable from the base. The release mechanism is on the shell. The base has recline tracks and the shell engages the tracks when installed. US publication no. 2005/0264064 and EP publication no. 1 761 142 to Orbit Baby disclose a car seat base that installs in a vehicle. Several different seat shells can be attached to the base, thus making this system modular. The car seat also has a pivoting action. EP publication no. 1 493 616 to Play SA discloses a car seat with a seat that is detachable from a base. Detachment of these seats from the bases is not particularly easy or intuitive.

SUMMARY

One example of a children's safety seat or car seat according to the teachings of the present invention has a base for placement on a vehicle seat and a seat shell removably attachable to the base. The seat shell has a seat back portion and a seat bottom portion. An upper latch mechanism connects the seat back portion to the base when engaged and a lower latch mechanism connects the seat bottom portion to the base when engaged. A release actuator is connected to each of the upper and lower latch mechanisms. Actuation of the release actuator disengages both the upper latch mechanism and the lower latch mechanism, which releases the seat shell for removal from the base.

In one example according to the invention, the release actuator can be a handle positioned at a top end of the seat back portion on the seat shell.

In one example according to the invention, the upper latch mechanism can include a pair of upper latches laterally spaced apart on a back side of the seat back portion.

In one example according to the invention, the upper latch mechanism can include a pair of upper latches that each have a latch pin biased outward away from one another when engaged.

In one example according to the invention, the lower latch mechanism can include a pair of lower latches laterally spaced apart on an underside of the seat bottom portion.

In one example according to the invention, the lower latch mechanism can include a pair of lower latches that each have a latch pin biased outward away from one another when engaged.

In one example according to the invention, the upper latch mechanism and the lower latch mechanism can be operably connected to one another by the release actuator and by a cable extending from the release actuator to the lower latch mechanism.

In one example according to the invention, a car sat can further have a recline actuator connected to at least one latch mechanism of the upper and lower latch mechanisms. The recline actuator can be operable to move the at least one latch mechanism to a recline arrangement permitting adjustment of the seat shell between at least two different recline positions without disengaging the seat shell for removal from the base.

In one example according to the invention, the base can have a shell mounting surface with one or more visible guides that indicate a belt path for routing a safety belt of a vehicle seat to secure the base to the vehicle seat.

One example of a children's safety seat or car seat according to the teachings of the present invention has a base for placement on a vehicle seat and a seat shell attachable to and detachable from the base. The seat shell can be adjustable on the base between a first and a second recline position and can have a seat back portion and a seat bottom portion. An upper latch mechanism attaches the seat back portion to the base in a latched arrangement and a lower latch mechanism attaches the seat bottom portion to the base in the latched arrangement. A release actuator on the car seat is connected to each of the upper and lower latch mechanisms. A recline actuator on the car seat can be connected to at least one latch mechanism of the upper and lower latch mechanisms. Actuation of the release actuator moves both the upper latch mechanism and the lower latch mechanism to a released arrangement detaching the seat shell for removal from the base. Actuation of the recline actuator can move the at least one latch mechanism to a recline arrangement, but not the release arrangement, allowing adjustment of the seat shell to a selected one of the first and second recline positions.

In one example according to the invention, the upper latch mechanism can include a pair of upper latches each having a pin biased laterally outward away from the other. Each pin can be slidable vertically along a slot on the base when in the latched arrangement permitting adjustment of the recline position of the seat shell.

In one example according to the invention, the lower latch mechanism can include a pair of lower latches each having a bracket spaced laterally apart from the other. Each bracket can have an inner wall, an outer wall spaced outward from the inner wall, an elongate track in the inner wall, and first and second recline detents in the outer wall aligned with the track and defining the first and second recline positions.

In one example according to the invention, the lower latch mechanism can have a pair of lower latches. Each lower latch can have a pin that seats in one detent of at least first or second optionally selectable recline detents in the corresponding bracket when in the latched arrangement. Each pin can also be withdrawn from the one detent but seated in a respective recline track of a lower latch bracket in the recline arrangement.

In one example according to the invention, the lower latch mechanism can have a pair of lower latches. Each lower latch can have a pin that seats in one detent of at least first or second optionally selectable recline detents in the corresponding bracket when in the latched arrangement. Each pin can be withdrawn from both the one detent and a respective recline track of a lower latch bracket in the released arrangement.

In one example according to the invention, the release actuator can be operably coupled to the at least one latch mechanism by a cable. A recline actuator can also be operably coupled to the at least one latch mechanism by a cable.

In one example according to the invention, the release actuator and a recline actuator can be provided as discrete actuators located at different locations on the seat shell.

In one example according to the invention, the release actuator can be a handle positioned near a top end of the seat back portion on the seat shell. A recline actuator can be provided as a handle positioned near a forward end of the seat bottom portion of the seat shell.

In one example according to the invention, a recline actuator, when actuated, can move the lower latch mechanism to a recline arrangement while not moving the upper latch mechanism from the latched arrangement. The upper latch mechanism in the latched arrangement can permit adjustment of the seat shell between first and second recline positions.

One example of a children's safety seat or car seat according to the teachings of the present invention has a base for placement on a vehicle seat and a seat shell attachable to and detachable from the base and adjustable thereon between at least two different recline positions. A latch mechanism on the car seat is biased to a latched position attaching the seat shell to the base and retaining the seat shell in one of the different recline positions. A release actuator on the car seat is connected to the latch mechanism and a recline actuator on the car seat is connected to the latch mechanism. Actuating the release actuator moves the latch mechanism to a released arrangement detaching and permitting removal of the seat shell from the base. Actuating the recline actuator moves the latch mechanism to a recline arrangement allowing adjustment of the recline position of the seat shell but not permitting removal of the seat shell from the base.

In one example according to the invention, the release actuator and the recline actuator can be two different actuators located at different locations on the seat shell.

BRIEF DESCRIPTION OF THE DRAWINGS

Objects, features, and advantages of the present invention will become apparent upon reading the following description in conjunction with the drawing figures, in which:

FIG. 3A shows a side view of the car seat shown in FIG. 1 and with the seat shell in a first recline position.

FIG. 3B shows the car seat shown in FIG. 3A with the seat shell in a second recline position.

DETAILED DESCRIPTION OF THE DISCLOSURE

The child safety seat or car seat examples disclosed and described herein solve or improve upon one or more of the above-noted and/or other problems and disadvantages with prior known car seat. In one example, the disclosed car seats is a relatively low cost, easy to use car seat that allows a parent to install the seat in an intuitive manner while reducing or eliminating opportunities for installation errors. The disclosed car seat includes a base that is separate from a seat shell, which mounts on the base. In one example, the base can be configured to allow complete visibility and accessibility to the belt paths with the seat shell removed. In one example, the base can be configured to provide pelt path routing guides to illustrate an intuitive belt path to the care giver when installing the base into the vehicle on the vehicle's seat. The base can first be secured on the vehicle seat using the vehicle's safety belt. In one example, the belt routing on the base can follow the natural shape of the belt and can easily and readily guide routing of the belt over the base.

In one example, the seat shell can then be attached to the base. According to the invention, the disclosed seat shell can be mounted to the base in one easy or simple step or motion. Also, the seat shell can be removed from the base in one easy or simple step or motion as well.

Figure 1:
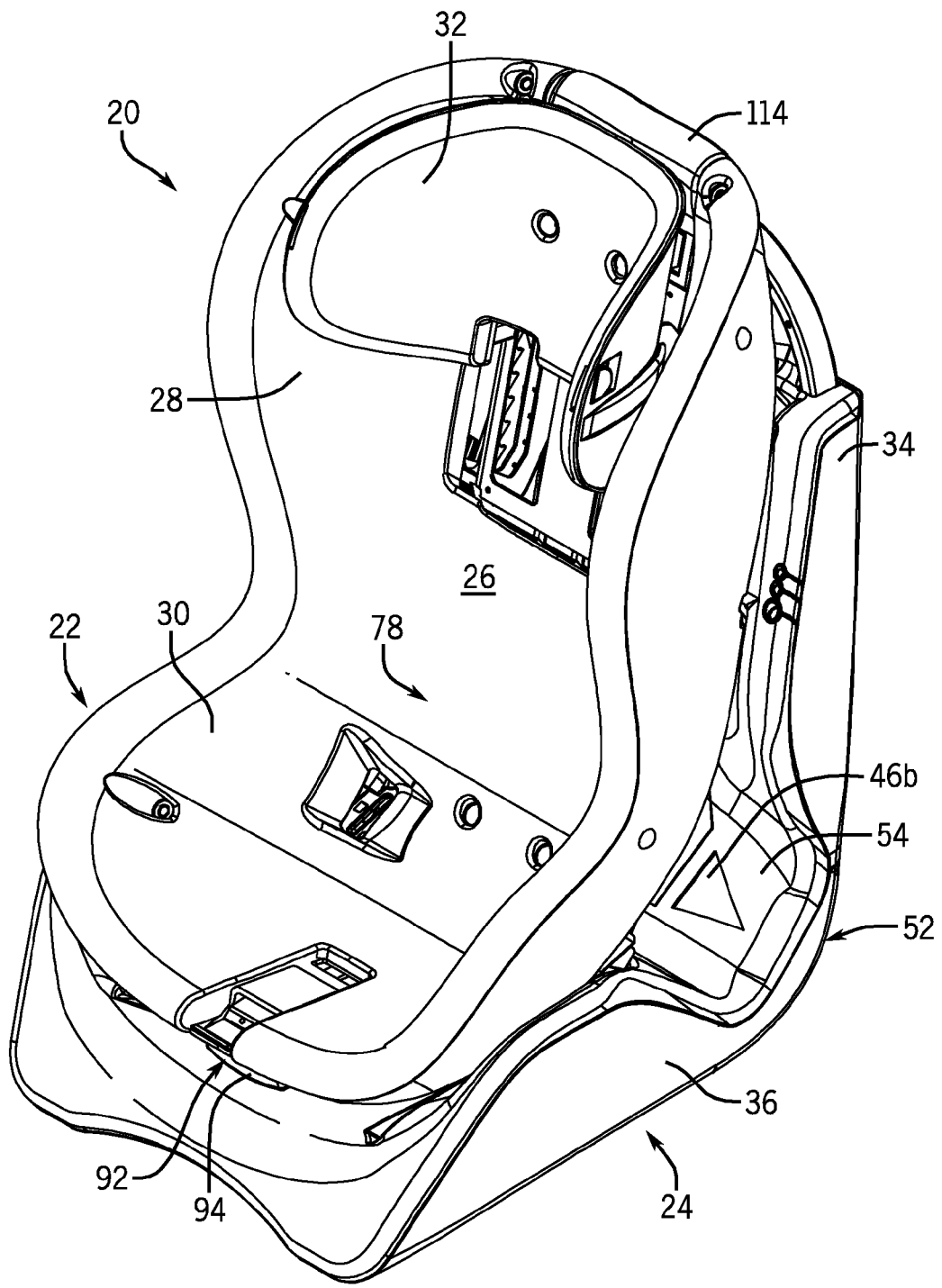
FIG. 1 shows a front, top, and side perspective view of a car seat constructed in accordance with the teachings of the present invention.
Figure 2:
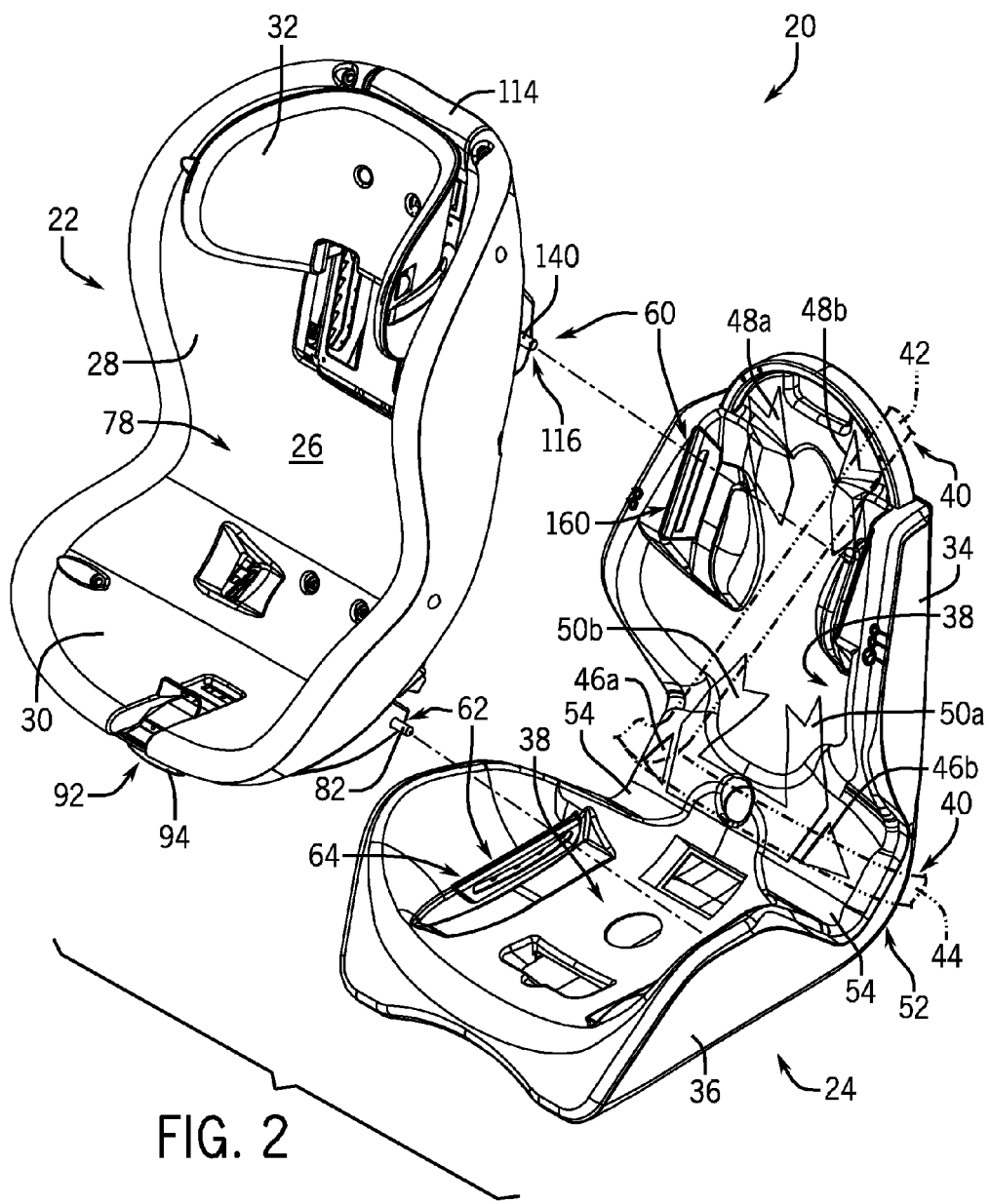
FIG. 2 shows a partly exploded view of the car seat shown in FIG. 1 illustrating the separate seat shell and base of the car seat.

Turning now to the drawings, FIG. 1 shows a one example of a car seat 20 constructed in accordance with the teachings of the present invention. FIG. 2 shows the car seat 20 in a partly exploded view. In general, the car seat 20 has a seat shell 22 and a base 24 that can be secured to the seat of a vehicle (not shown). The seat shell can then be attached to the base 24 as discussed below. The seat shell 22 generally has an upward and forward facing seating surface 26 as is known in the art. A seat back portion 28 of the seat shell 22 extends up from a rear end of a seat bottom portion 30 of the seat shell. The seating surface 26 is defined in part by the front or exposed surfaces of the seat back and bottom portions. In the disclosed example, the seat shell 22 also includes a head rest 32 near an upper end of the seat back portion 28 on the seating surface side of the seat shell. A typical seat shell 22 would have soft goods, such as a fabric cover, pads, and/or cushions over the shell as is know in the art. Such soft goods are not shown herein.

The base 24 in this example includes a seat back section 34 projecting up from a rear end of a seat bottom section 36, each of which corresponds positionally with the respective seat back and seat bottom portions 28 and 30 of the seat shell 22. As shown in FIG. 2, the base 24 has a seat mounting surface 38 that is exposed upwardly and formerly. The seat shell 22 is mounted to the seat mounting surface 38 during use. The shape, size, contour, configuration, and construction of the basic seat shell and base components can vary significantly from the examples shown and described herein. The materials and manufacturing methods used to fabricate the seat shell and base can also vary within the spirit and scope of the present invention.

With reference to FIG. 2, additional features of the base 24 are discussed. Though the vehicle seat is not shown herein, a vehicle seat belt 40 is illustrated in phantom view as it would be routed when the base 24 is secured to the vehicle seat. The seat belt 40 generally has a shoulder strap 42 and a lap strap or belt 44, as is commonly known in the art. In accordance with one aspect of the invention, exposed regions on the seat mounting surface 38 of the base 24 can include visible or visual indicia or markings that indicate to a caregiver the proper routing and positioning for the seat belt 40, i.e., the belt path, when properly secured on the vehicle seat. In one example, a plurality of brightly colored or differently colored indicia can be provided on the exposed mounting surface 38 to clearly indicate and identify the proper belt routing or belt paths on the base 24.

As shown, a lap belt path can be indicated by a pair of lap strap arrows 46a, 46b or markings that are positioned near the lower end of the seat back section 34. The markings or arrows 46a, 46b in one example can be bright red arrows on a gray base 24. One lap strap arrow 46a, 46b is positioned on each side of the seat back section 34 in this example. Together, the arrows 46a, 46b can indicate to a caregiver the proper routing and positioning or belt path for the lap belt 44 of the seat belt 40. Depending on which side of the vehicle seat that the base 24 is to be mounted, the pointing direction of the lap strap arrows 46a, 46b can indicate the direction toward which the lap belt 44 need be pulled during installation.

Similarly, a pair of upper shoulder strap arrows 48a, 48b or markings is provided as belt path indicia or routing guides near the upper end of the seat back section 34, one on each side of the section. Each of the arrows 48a, 48b can also be a red or other brightly colored indicator and can be pointed downward and diagonally across the seat mounting side 38 of the seat back section 34. A corresponding pair of lower shoulder strap arrows 50a, 50b are also provided near the bottom of the seat back section 34, but on opposite sides of the seat back so as to correspond and align diagonally with their respective upper arrows 48a, 48b. As shown, the shoulder strap 42 of the seat belt 40 is routed over the top end of the base 24 and then diagonally down and across the seat back section 34. Each pair of diagonally aligned set of arrows 48a, 50a and 48b, 50b can be used to indicate the correct, diagonal belt path for the shoulder strap 42, depending on which side of the vehicle seat that the car seat 20 is to be secured. Again, each set of arrows or markers can point in a downward direction indicating the direction in which the caregiver should pull the safety belt 40 during installation of the car seat 20.

A seat bight region 52 on the base 24 is defined at the junction between the lower end of the seat back section 34 and rear end of the seat bottom section 36. The sides 54 of the seat bight region 52 in this example are scalloped or notched out so that the lap belt 44 of the vehicle's seat belt 40 can be easily routed over and across the base 24 and register with the base when the belt is properly installed. Though not shown herein, a vehicle seat belt lock-off can be positioned at the top end of the seat back section 34. As is known in the art, the lock-off can clamp onto the shoulder strap 42 to securely retain the base 24 secured to the vehicle seat. The top end of the seat back section 34 on the base 24 can also be molded with one or more scallops, notches, or other contoured features, instead of or in addition to a lock-off being utilized. The contoured features can assist in locating and guiding the shoulder strap 42 of a vehicle seat belt 40 over the seat back section 34 during installation.

As will become evident to those having ordinary skill in the art upon reading this disclosure, the visual indicia, such as the arrows as disclosed herein can vary in configuration, color, size, location, and the like and yet function as intended. In one example, the arrows or other indicia can be in-molded as a part of the base material, but from a material having different visual characteristics, tactile characteristics, and/or the like. For example, the base can be molded from a standard gray plastic and the arrows can be in-molded from a bright red plastic material into or as part of the base material during manufacture. In another example, the indicia or arrows can be applied as adhesive backed add-ons to the base. In another example, the visible markers or indicia can be extruded, brightly colored parts that snap onto the base or snap into channels in the base surfaces. In yet another example, the belt path indicators or markers can each instead include a pair of opposed, spaced apart colored lines. The lines can extend over the entire width of the bottom end of the seat back section demarking a track across the entire widthwise path for the lap belt 44. Similarly, pairs of the lines can crisscross over the seat back section 34 and define the two optional tracks or diagonal paths for the shoulder belt 42.

Once the base 24 is installed on the vehicle seat and secured in place by the seat belt 40, the seat shell 22 can be installed onto the base as in FIG. 1. The connection of the seat shell 22 to the base 24 and the components and mechanisms used to do so are now described. As generally shown in FIGS. 2 and 3, a seat to base latching mechanism is provided that connects the seat shell 22 to the base. Portions of the latching mechanism are provided on the base 24 in this example and portions are provided on the seat shell 22. As will be evident to those having ordinary skill in the art upon reading this disclosure, these latching mechanism components can be swapped between the base and the shell and can vary from the examples disclosed and described herein. In one example, the seat to base latching mechanism can include an upper latching mechanism associated with the seat back portion 28 and seat back section 34 and can include a lower latching mechanism associated with the seat bottom portion 30 and seat bottom section 36 of the shell and base.

As shown in FIG. 2, both the base 24 and the seat shell 22 can carry parts of an upper latching mechanism 60 and a lower latching mechanism 62. In the disclosed example, the lower latching mechanism 62 also defines or provides components for a recline mechanism. As depicted in the FIGS. 3A and 3B, the seat shell 22 in this example can be moved or adjusted to at least two different recline positions. FIG. 3A shows the seat shell 22 in a more upright incline position relative to the base 24 and FIG. 3B shows the seat shell in a more reclined position relative to the base. The seat shell 22 can move forward and downward in the direction of the arrow R as shown in FIG. 3B in order to move the shell from the more upright position to the more reclined position. The seat shell 22 can be moved in the opposite direction to return the seat shell to the upright position in this example. As will be evident to those having ordinary skill in the art, more than just the two illustrated recline positions are permissible by designing additional selectable positions into the mechanisms and components, as described below.

Figure 4:
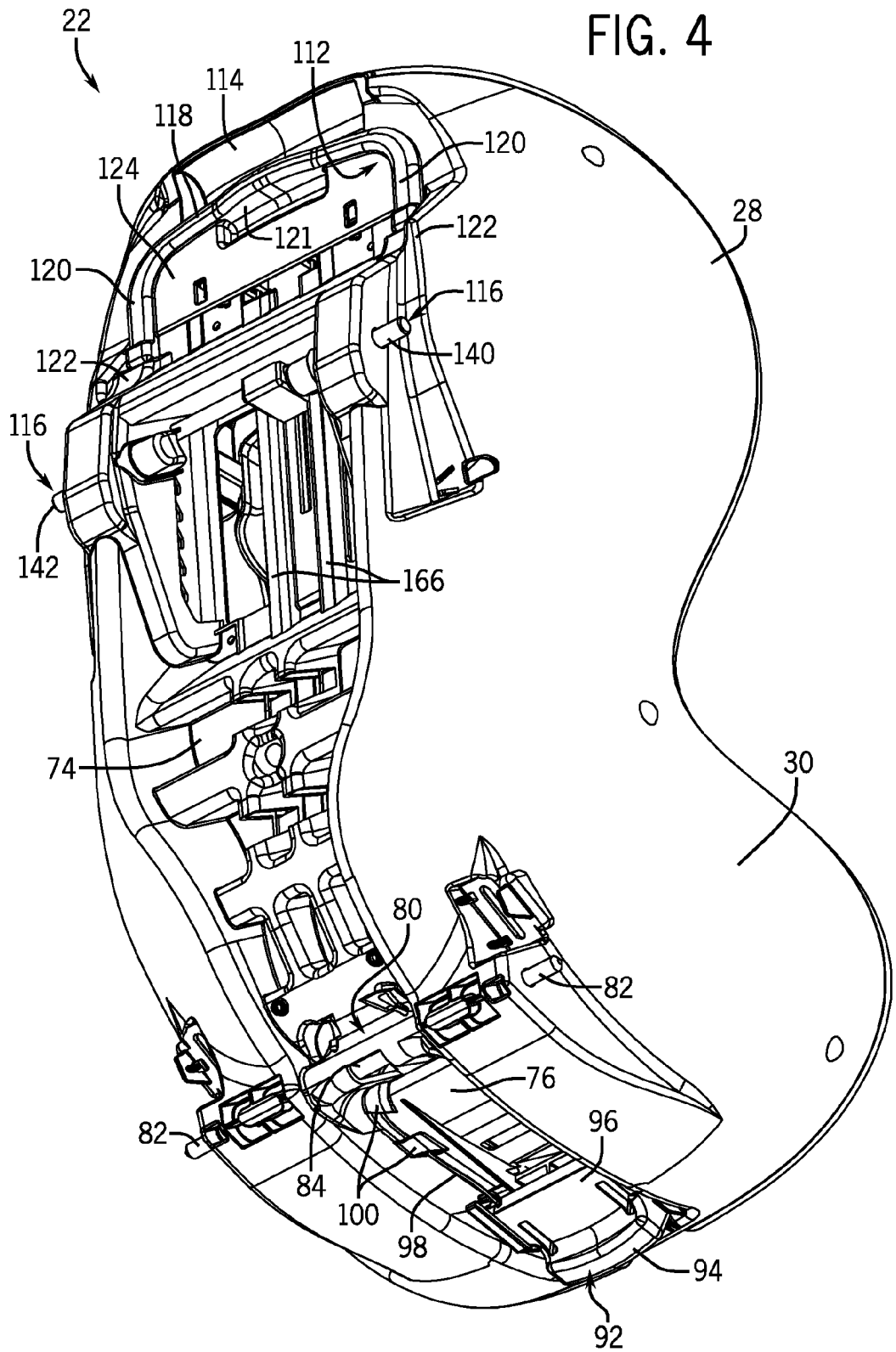
FIG. 4 shows a bottom, rear, and side view of the seat shell shown in FIG. 2.
Figure 5:
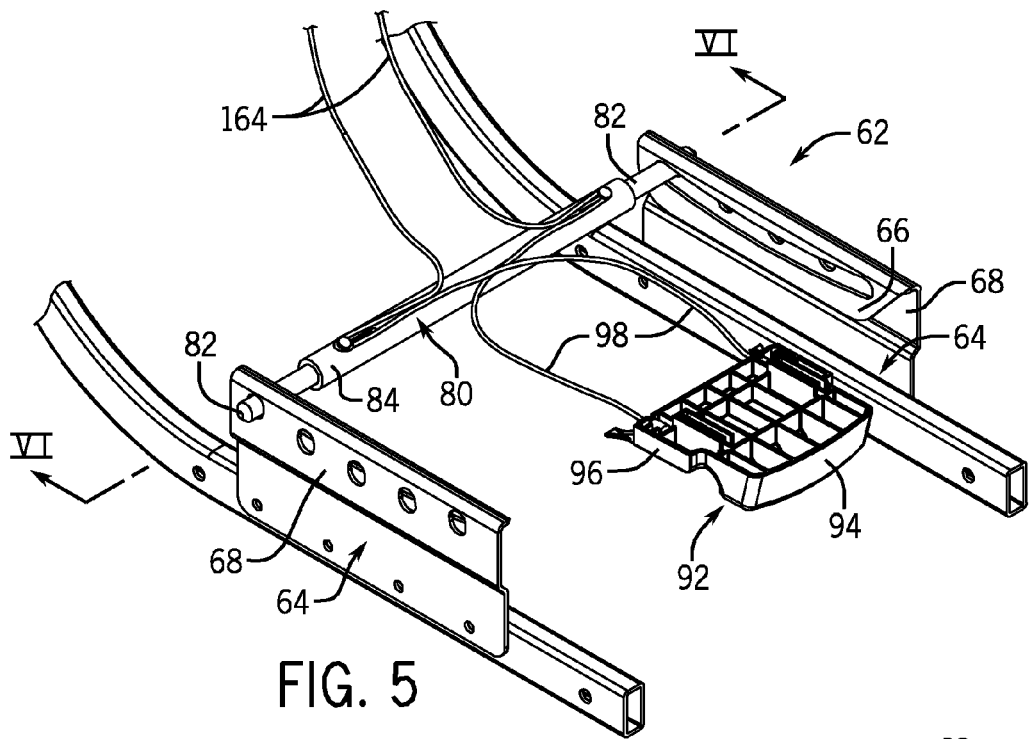
FIG. 5 shows a perspective view of one example of a lower latch mechanism of the car seat shown in FIG. 1.
Figure 6A:
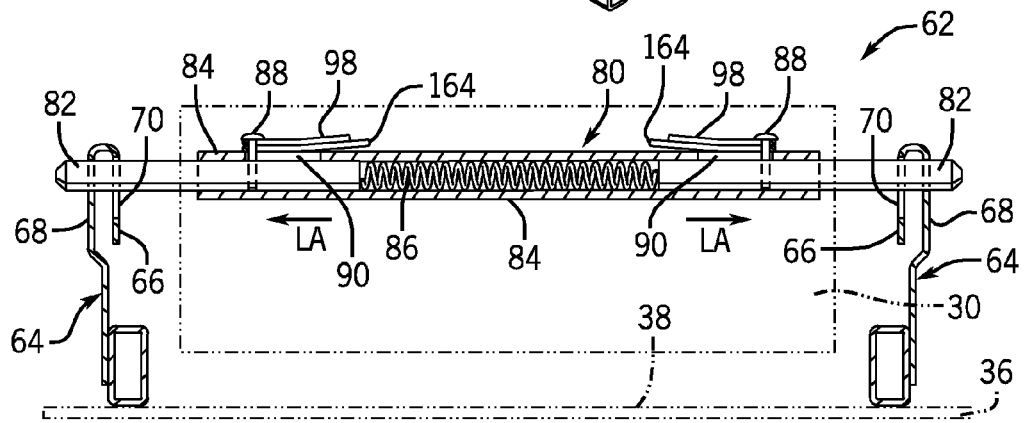
FIG. 6A shows a cross-section taken along line VI-VI of FIG. 5 with the lower latch mechanism in a latched arrangement.

FIGS. 2, 4, and 5 show the components of the lower latch mechanism 62 of the present example. The lower latch mechanism 62 has a pair of lower brackets 64 that are carried on the seat mounting side 38 of the seat bottom section 36 on the base. Each of the lower brackets 64 is elongate in a front to back direction on the seat bottom section 36. The lower brackets 64 are laterally spaced apart from one another across the width of the seat bottom section 36 as well. Each of the lower brackets 64 in this example is an inverted U-shaped structure that defines an inner wall 66 and an outer wall 68 separated from one another by a gap as shown in FIG. 6A. The inner wall 66 of each of the lower brackets 64 carries a recline slot or track 70 that extends lengthwise along the wall and through the wall. The outer wall 68 of each of the lower brackets 64 carries a plurality of recline position detents, which in this example are formed as a plurality of through-holes 72. The through-holes or holes 72 pass through the outer wall 68 and are spaced apart from one another lengthwise along the bracket. Each of the position detents or holes 72 is also aligned horizontally with the recline slot 70. In this example, each lower bracket 64 has five recline detents or holes 72, each of which defines one of five selectable recline positions, though only two are shown on the drawings. The number of recline positions, if a recline feature is provided, can vary as noted above.

FIG. 4 illustrates that the seat shell 22 has a back side 74 opposite the seating surface 26 on the seat back portion 28 and an underside 76 opposite the seating surface 26 on the seat bottom portion 30. The lower latch mechanism 62 in this example also includes a latch 80 that is positioned on the underside 76 near a seat bight region 78 of the seat shell 22. As shown in FIGS. 4-6B, the latch 80 has a pair of lower latch pins 82 that project outward in opposite directions from the ends of a latch sleeve 84. The lower latch pins 82 are received within the sleeve 84, which is an open tube structure in this example. A pin spring 86 is provided within the sleeve 84 between the lower latch pins 82 and biases the pins out of the ends of the sleeve 84 in opposite directions. As shown in FIG. 4, the lower latch pins 82 project out through openings on opposite sides of the seat shell 22.

As shown in FIGS. 6A-7B, each lower latch pin 82 is horizontally oriented and has a trigger or stud 88 projecting vertically upward from the side of the pin. Each stud 88 projects through a travel slot 90 in each end of the sleeve 84. The travel slots 90 limit the inward travel of the lower latch pins 82 and also act as a stop for each pin in an outward direction and thus retain the pins within the sleeve 84. In this example, a recline actuator 92 is provided on the car seat 20 for actuating the lower latch mechanism, and particularly the lower latch pins 82. In this example, the recline actuator 92 is in the form of a handle with a grip 94 that can be grasped by a caregiver in order to actuate the recline actuator. The recline actuator 92 also includes a cable connector 96 extending rearward from the grip 94. The recline actuator 92 is positioned on the underside of the seat bottom portion 30 on the seat shell in this example. As noted above, the various components of the lower latch mechanism 62, inclusive of the recline mechanism components, can be swapped and can be mounted to the base 24 instead of the seat shell 22.

The cable connector 96 is coupled to two recline cables 98 that extend rearward from the recline actuator 92. As generally shown in FIG. 4, the underside 76 of the seat shell 72 is provided with a plurality of cable guides 100 or channels that route and guide the recline cables 98 and retain the cables in the position during use. The two recline cables 98 are spaced apart and parallel to one another, extending rearward toward the latch 80. The cables are then turned such that they crisscross one another and are directed toward the opposite side trigger or stud 88 of the corresponding lower latch pin 82. The recline cables 98 are connected to the respective studs 88. In order to actuate the lower latch pins 82, the recline actuator 92 can be grasped on the grip 94 and pulled forward in the direction of the arrow RA depicted in FIG. 3B. Pulling on the recline actuator 92 pulls on the recline cables 98, which in turn moves the lower latch mechanism to a recline arrangement as described immediately below.

Figure 7A:
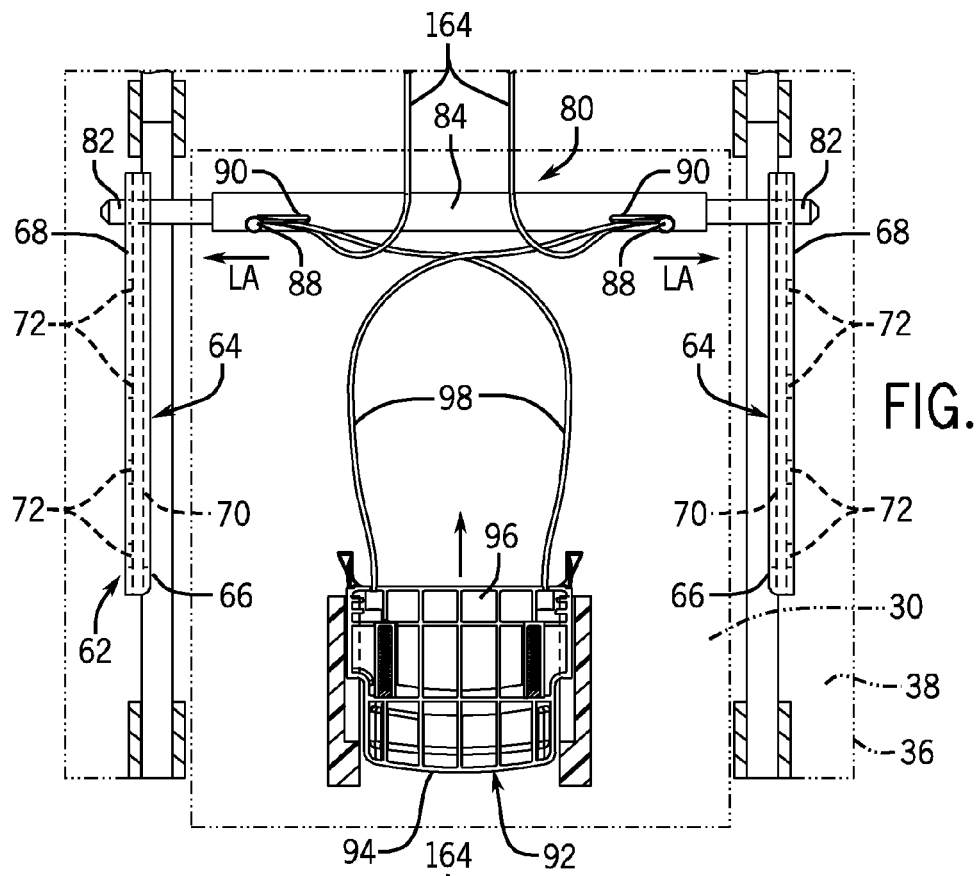
FIG. 7A shows a top view of the latch mechanism shown in FIG. 6A.

When the lower latch pins 82 are fully extended from the sleeve 84 of the latch 80, as shown in FIGS. 6A and 7A, the lower latch mechanism 62 is in a latched arrangement. In the latched arrangement, the lower latch pins 82 are biased outward in the direction of the arrows LA, extend through the recline tracks or slots 70, and pass through a selected pair of the recline detents or holes 72. With the lower latch pins 82 seated in a selected pair of the holes 72, the seat shell 22 cannot be moved and thus the recline position of the shell also cannot be adjusted. Additionally, the seat shell 22 cannot be removed from the base because the lower latch pins 82 are captured in the holes 72 of the brackets. As a result, the seat shell 22 can neither be reclined nor removed from the base 24 with the lower latch mechanism 62 in the latched arrangement.

Figure 6B:
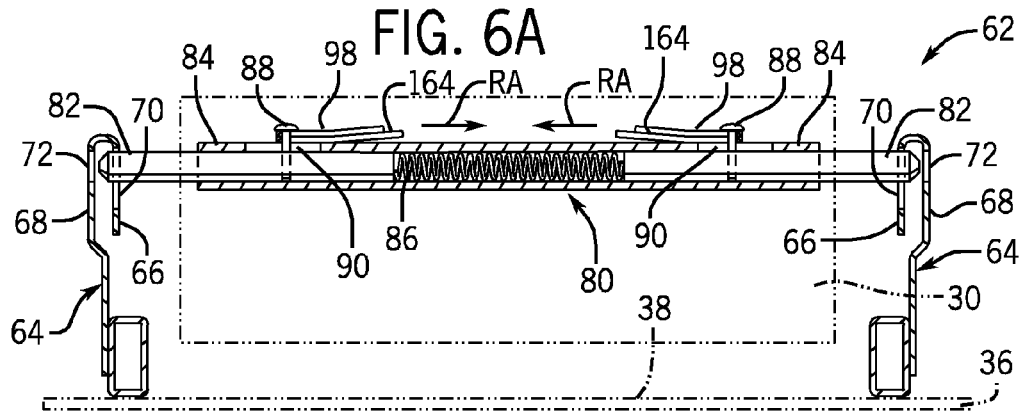
FIG. 6B shows the lower latch mechanism shown in FIG. 6A in an intermediate or recline adjustment arrangement.
Figure 7B:
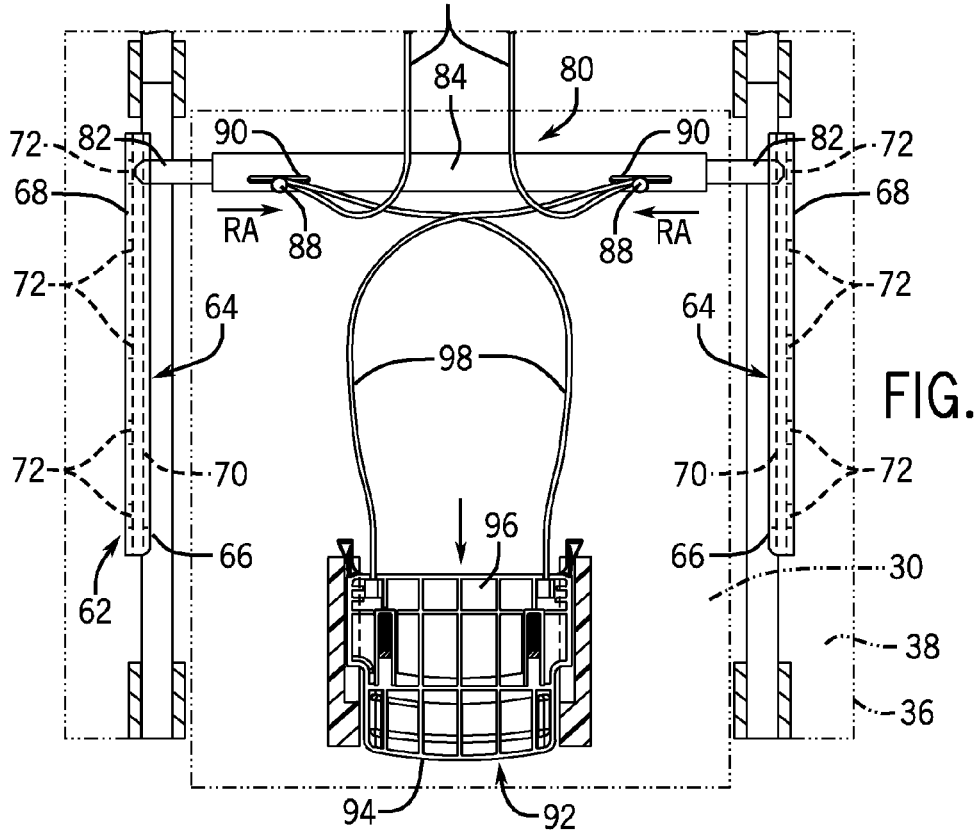
FIG. 7B shows a top view of the latch mechanism shown in FIG. 6B.

When the recline actuator 92 is actuated by pulling the handle forward, the crisscrossing recline cables 98 move the lower latch pins 82 inward into the ends of the sleeve 84 in the direction of the arrows RA. However, the travel of the recline actuator 92 and the length of the cables 98 are designed such that the lower latch pins 82 are only moved to an intermediate position, i.e., the lower latch mechanism 62 is moved to a recline arrangement as illustrated in FIGS. 6B and 7B. In the recline arrangement, the triggers or studs 88 travel only a portion of the length of the travel slot 90, not the entire length of the slots. In the recline arrangement, the lower latch pins 82 are drawn into the sleeve ends toward one another and are thus withdrawn from the recline detents or holes 72. However, the lower latch pins 82 do not travel far enough inward to withdraw from the recline slots or tracks 70. As a result, the lower latch pins 82 are free to move or slide along the recline tracks 70, but are not free to be released entirely from the lower brackets 64. The lower latch pins 82 are still captured within the recline tracks 70 and can not be moved upward from the lower brackets 64 to release the seat bottom portion 30 of the seat shell 22 from the seat bottom section 36 of the base 24.

When the seat shell 22 achieves the desired or selected recline position, such as that shown in FIG. 3A or 3B, the recline actuator 92 can be released. Though not shown herein, the recline actuator 92 can also be spring biased inward under the seat bottom portion 30 in the reverse direction of the arrow R, returning to a rest or non-actuated position. Even if the lower latch pins 82 are not yet aligned with a selected pair of the recline detents or holes 72 when the release after 92 is let go, the pin spring 86 will fire the pins into the next adjacent holes 72 as the seat shell 22 is moved and as the pins align with a pair of the holes.

The recline function described above can be an optional feature in accordance with the teachings of the present invention. The seat shell 22 of the present invention need not be cable of being reclined within the spirit and scope of the present invention. The seat shell 22 can instead be attachable to the base in only one incline position, if desired. Also, the components providing the recline function can vary from the example shown, as mentioned further below.

Figure 8:
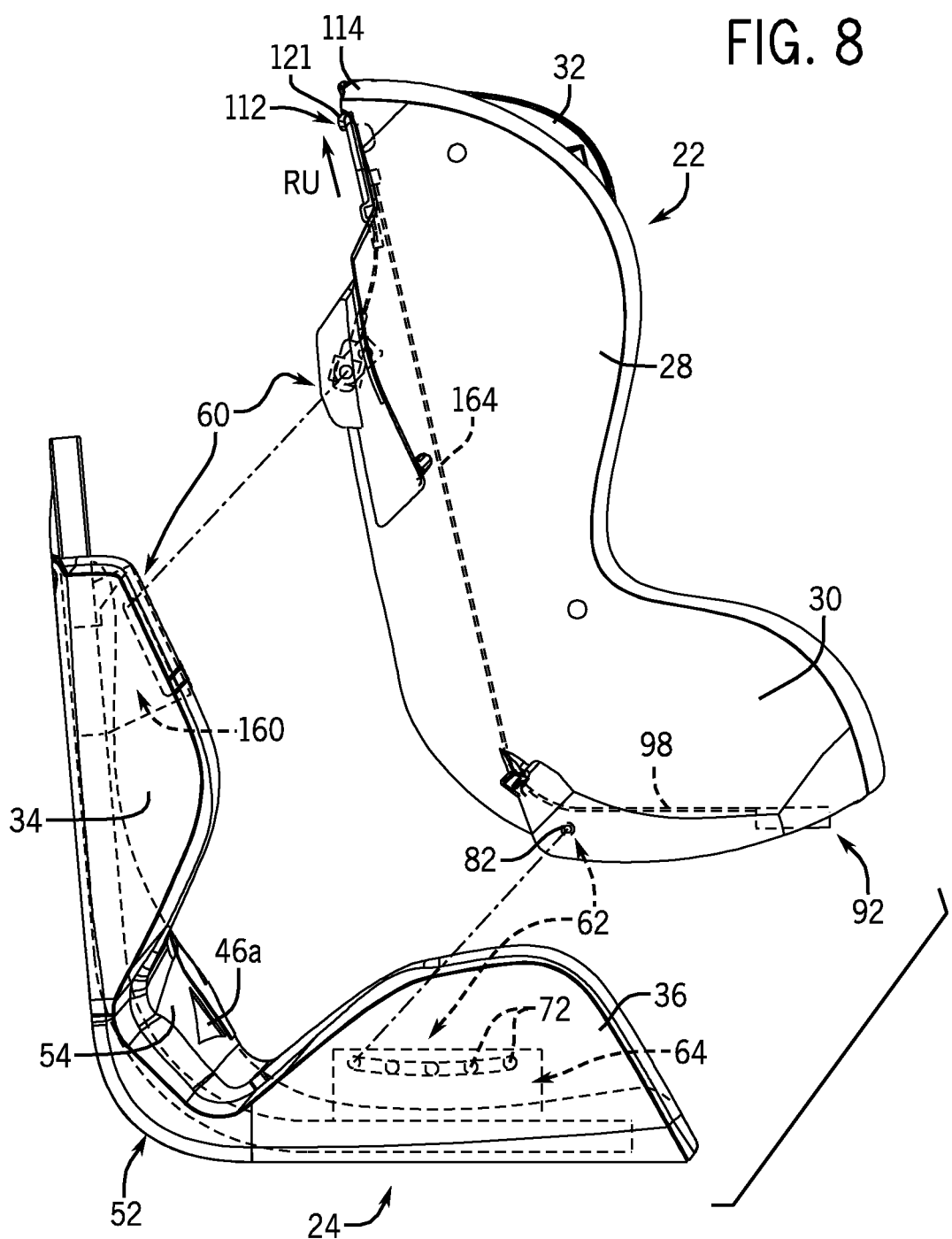
FIG. 8 shows a side view of the car seat shown in FIG. 2 with the seat shell released from the base.

As shown in FIGS. 2 and 8, the upper and lower latch mechanisms 60 and 62 can be moved or rearranged to permit the seat shell 22 to be completely removed from the base 24. The various components of the upper latch mechanism 60 are now described with reference to FIGS. 2, 4, and 9. In this example, the upper latch mechanism 60 employs a pair of upper latches 110 that are laterally spaced apart from one another on the seat back portion 28 of the seat shell 22. The upper latches 110 are operably connected to one another by a release actuator 112 on the car seat 20. In this example, the release actuator 112 is carried near an upper end 114 of the seat back portion 28. Each of the upper latches 110 has an upper latch pin 116. The upper latch pins 116 oppose one another and are biased to protrude outward from holes on opposite sides of the seat shell 22 as shown in FIG. 4.

Figure 9:
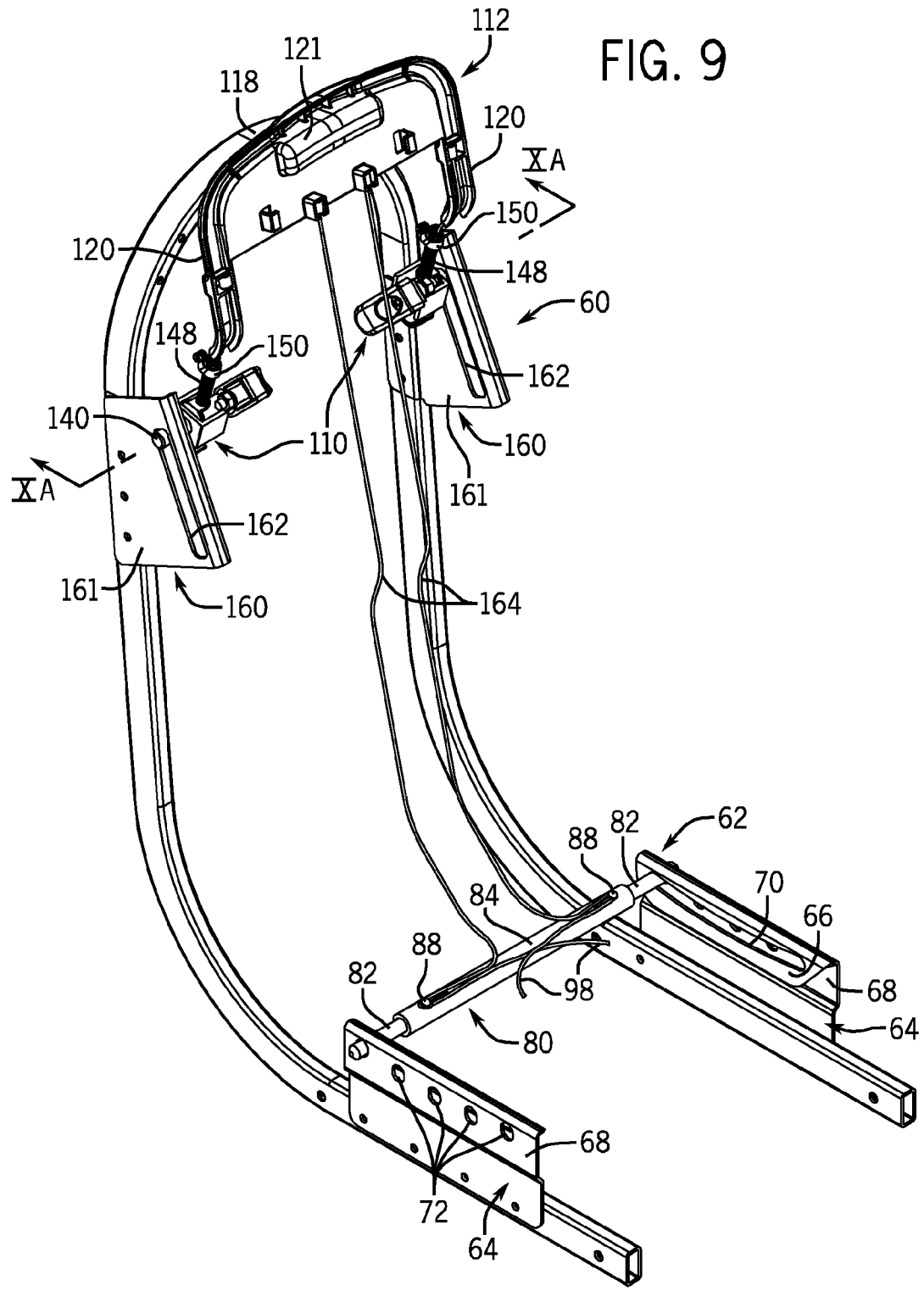
FIG. 9 shows a perspective view of the upper and lower latch mechanisms of the car seat shown in FIG. 1.
Figure 10A:
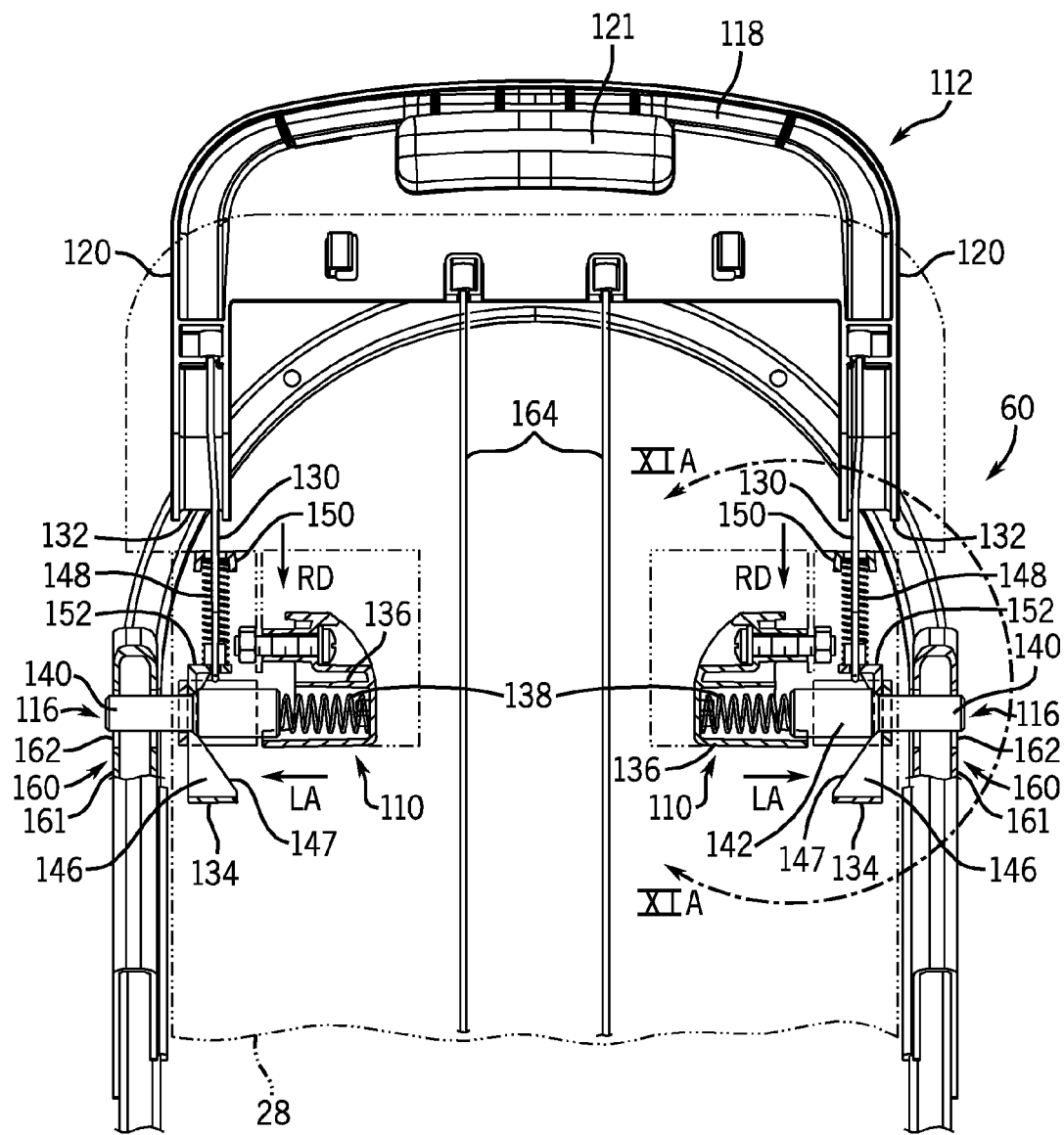
FIG. 10A shows a cross-section taken along line X-X in FIG. 9 of the upper latch mechanism and in a latched arrangement.
Figure 11A:
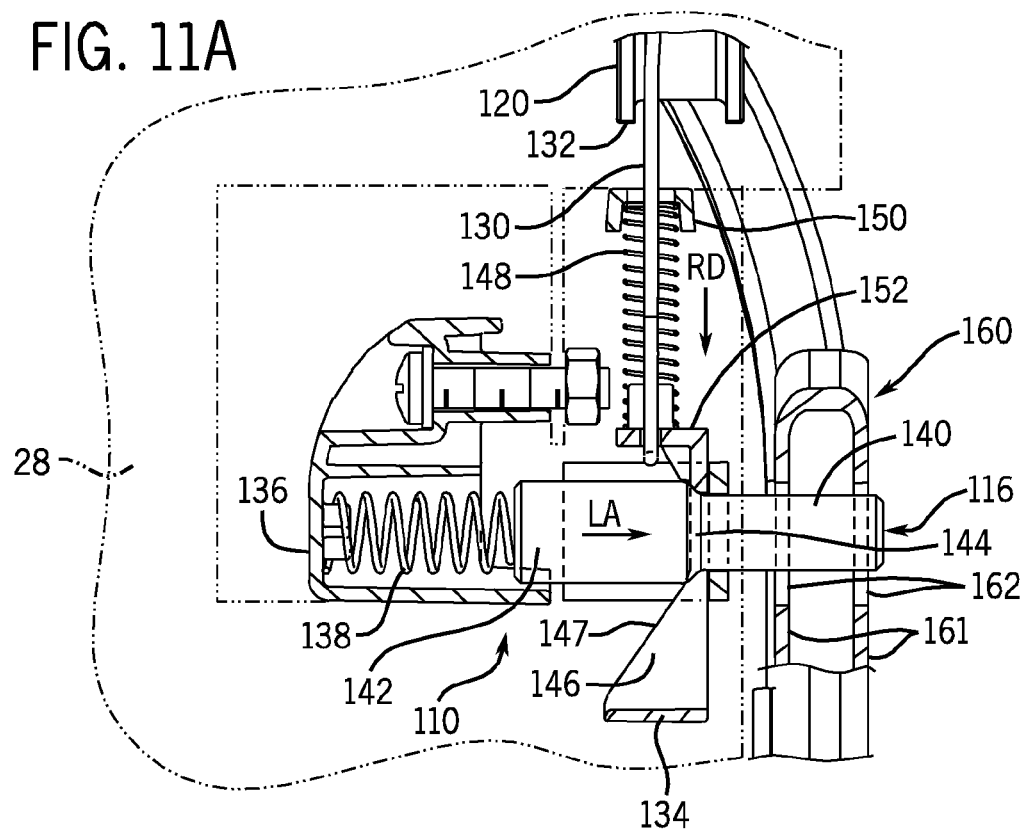
FIG. 11A shows an enlarged view of one latch of the upper latch mechanism shown in FIG. 10A.

FIGS. 9, 10A and 11A show the upper latch mechanism 60 in the latched arrangement. In this example, the release actuator 112 is an inverted U-shaped structure having a horizontal handle 118 with a pair of depending legs 120 that are laterally spaced apart from one another. The handle 118 in this example also has a grip 121 that a user can easily grasp to actuate the release actuator 112. As shown in FIG. 4, the legs 120 extended downward into pockets 122 formed in the back side 74 of the seat back portion 28. The release actuator 112 is slidable in a vertical direction relative to the seat back portion 28 and seats within a recess 124 in the back side 78 at the upper end 114 on the seat back portion 28. The upper end 114 overhangs the release actuator 112 and provides a point of leverage against which a user can rest their palm or their thumb when actuating the release actuator 112 during use.

Release cables 130 are coupled at one end to the bottom 132 of each of the legs 120. The other end of each release cable 130 is connected to a motion transfer mechanism 134 of each of the upper latches 110. The motion transfer mechanisms 134 can travel upward and downward on the back side 76 along with movement of the cables. Each of the upper latch pins 116 is captured within a pin housing 136 on the seat shell 22 and is biased in the direction of the arrows LA in an outward direction by a latch spring 138 positioned within its corresponding pin housing. Each of the upper latch pins 116 has a smaller diameter latching end 140 and a larger diameter load end 142. The latching ends 140 project outward from the holes in opposite sides of the seat shell 22 and are exposed. The load ends 142 are housed within the pin housings 136. The holes through the sides of the seat shell 22 can be sized so that the load ends 142 are too big to pass through, thus limiting outward travel of the upper latch pins 116. A tapered or chamfered surface 144 is provided around each of the upper latch pins 116 between the load and latching ends. An upwardly open U-shaped slot 146 is provided in each of the motion transfer mechanisms 134. This slot is oriented on an angle defining a ramp surface 147 that tapers outward moving from bottom to top as depicted in FIG. 11A. The latching ends 140 of the pins are seated in the corresponding slots 146 on the motion transfer mechanisms 134. The chamfered surfaces 144 rest or ride on the ramps 147

FIGS. 10A and 11A show the upper latch mechanism 60 in the latched arrangement. A cable spring 148 is secured on each of the release cables 130 and has an upper end born against a fixed spring stop 150. A lower end of the each cable spring 148 bears against a surface 152 on its respective motion transfer mechanisms 134. In the latched arrangement, the cable springs 148 bias the motion transfer mechanisms 134 and the release actuator 112 downward in the direction of the arrows RD. This places the chamfered surface 144 on each of the upper latch pins 116 at the upper end of the ramped surfaces 147 along the angled slots 146. This positioning allows the latch springs 138 to bias the upper latch pins 116 outward extending from the sides of the seat shell 22. The cable springs 148 effectively also bias the release actuator 112 downward to a rest or non-actuated position.

The upper latch mechanism 60 in this example also includes a pair of upper latch brackets 160 carried on the seat mounting side 38 of the seat back section 34 on the base 24. Each of the upper latch brackets 160 is elongate in a vertical direction and has a pair of spaced apart walls 161 for strength and rigidity. A generally vertically oriented slide track 162 is formed through each wall 161 of each of the upper brackets 160. In the latched arrangement, the latching ends 142 of the upper latch pins 116 protrude through the respective one of the slide tracks 162 and are captured therein. Even in the latched arrangement, the upper latch pins 116 are free to slide along the slide tracks 162. This allows the recline position of the seat shell 22 to be adjusted from one recline position to another without releasing the upper latch mechanism 60. However, the slide tracks 160 prevent the upper latch pins 116 from disengaging the upper latch brackets 160 in the latched arrangement. Thus, the seat shell 22 remains connected in the latched arrangement to the base 24 at the respective seat back portion 28 and seat back section 34 on each component.

Figure 10B:
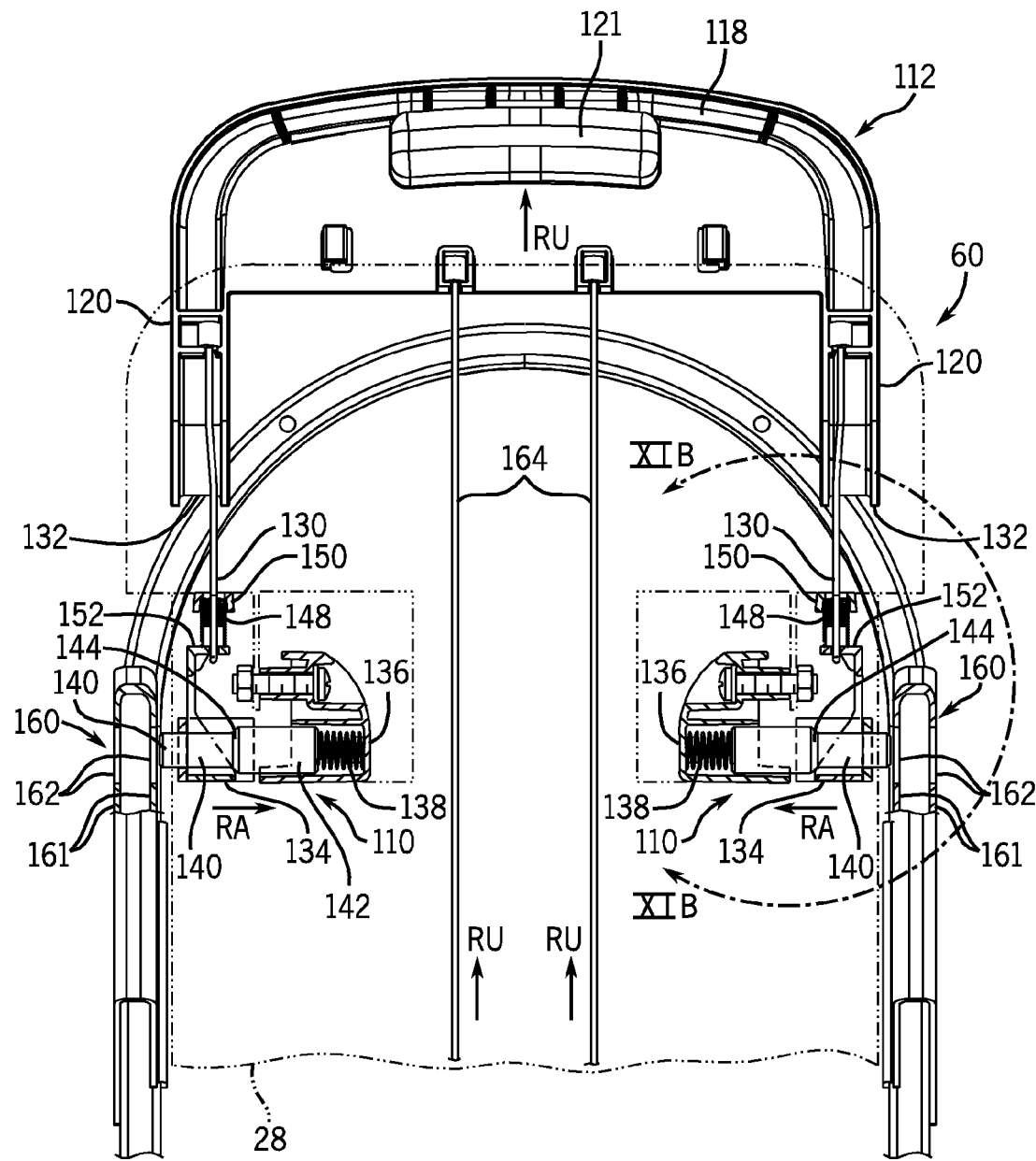
FIG. 10B shows the upper latch mechanism shown in FIG. 10A and with the upper latch mechanism in a released or disengaged arrangement.
Figure 11B:
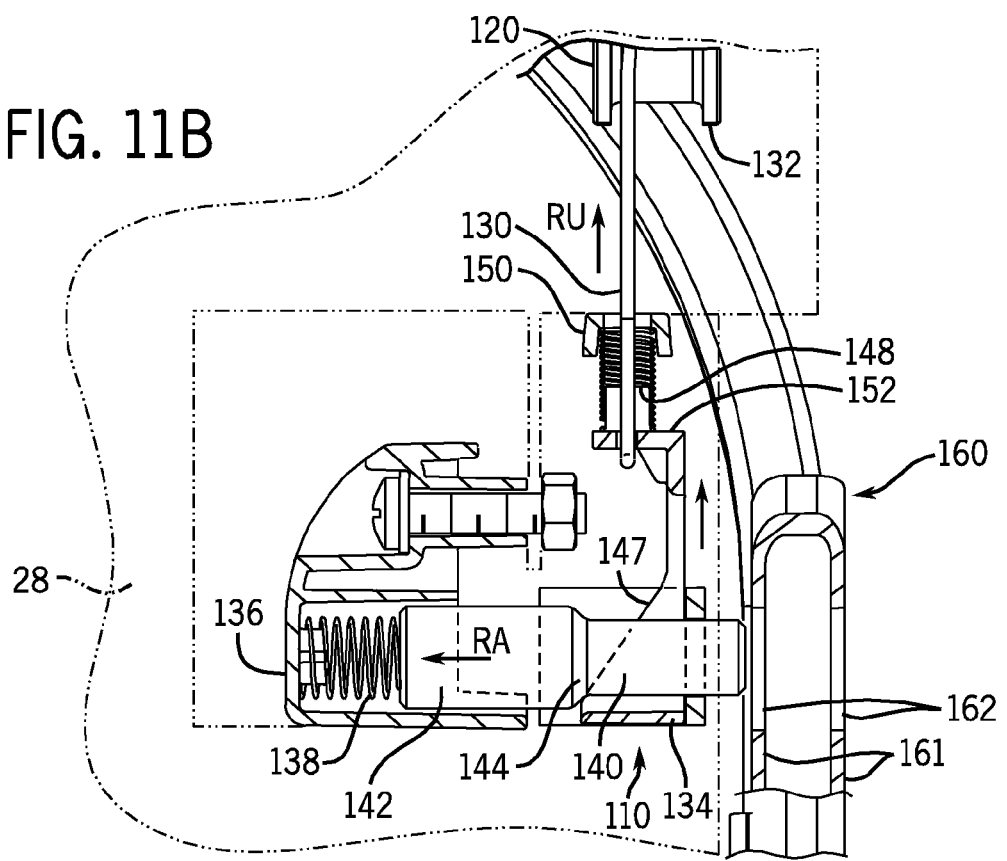
FIG. 11B shows an enlarged view of one latch of the upper latch mechanism shown in FIG. 10B.

A caregiver can grasp the grip 121 of the handle 118, using the upper end 114 for leverage, and pull the release actuator 112 upward in the direction of the arrow RU as shown in FIGS. 8 and 11B. By pulling the release actuator 112 up, the release cables 130 are also pulled up against the bias of the cable springs 148. This in turn pulls up the motion transfer mechanisms 134. The chamfered surfaces 144 ride along the ramps 147 created by the angled slots 146 as shown in FIGS. 10B and 11B. Each of the upper latch pins 116 is then forced inward in the direction of the arrows RA against the bias of the latch springs 138 and into the pin housings 136. The latching ends 142 of the upper latch pins 116 withdraw from the slide tracks 162 when retracted. This frees the upper latch pins 116 to be released from the upper latch brackets 160, allowing the seat back portion 28 to be removed from the seat back section 34.

As shown in FIG. 9, a pair of supplemental release cables 164 is connected at one end to the release actuator 112. The opposite ends of the supplemental release cables 164 are connected to the triggers or studs 88 on the lower latch pins. In one example, each recline cable 98 can corresponding supplemental cable 164 can be a continuous cable wrapped around and secured to the respective trigger or stud 88. Alternatively, the recline cables 98 and supplemental cables 164 can be separate and discrete cables.

Figure 12:
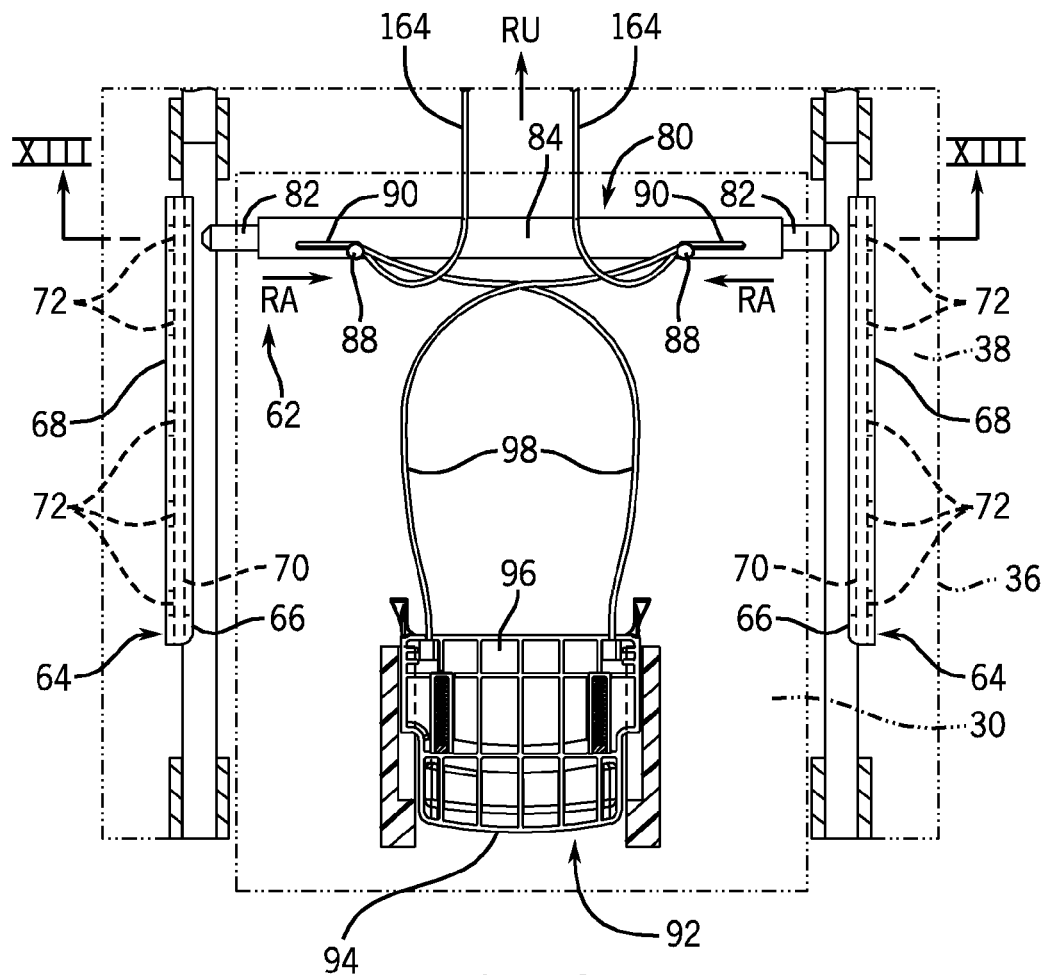
FIG. 12 shows a top view of the lower latch mechanism shown in FIG. 7B and in a released arrangement.
Figure 13:
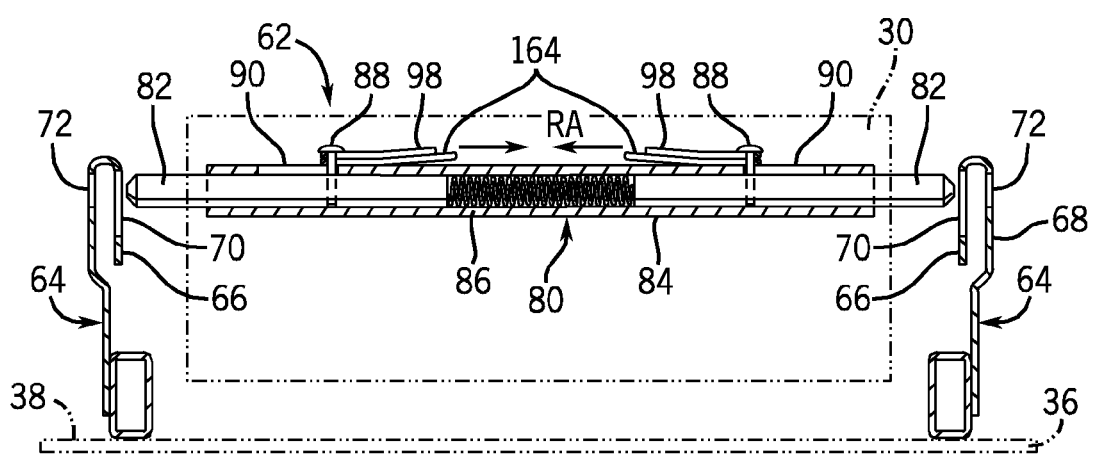
FIG. 13 shows a cross-section taken along line XIII-XIII of the lower latch mechanism shown in FIG. 12.

The supplemental cables 164 are again routed and guided by cable guides or channels 166 provided along or within the back side 76 of the seat back portion 28 on the seat shell 22. The supplemental cables 164 crisscross beneath the seat bottom portion 30 and are connected to the opposite trigger or stud 88. When the release actuator 112 is actuated or pulled up in the direction of the arrow RU, the supplemental cables 164 are also pulled up which in turn draws the lower latch pins 82 inward toward one another. As shown in FIGS. 12 and 13, the lower latch pins 82 are drawn inward upon actuation of the release actuator 112 until the triggers or studs 88 bear against the inner ends of the travel slots 90. Thus, the release actuator 112 moves the lower latch mechanism 62 beyond the intermediate recline arrangement to the released arrangement depicted in FIGS. 12 and 13. In the released arrangement, the lower latch pins 82 are fully withdrawn from both the recline detents or holes 72 and the recline tracks or slots 70. The lower latch pins 82 can then clear the lower latch brackets 64, disengaging the lower latch mechanism 62 permitting removal seat bottom portion 30 from the seat bottom section 36.

The simple, a single actuation of the release actuator 112 disengages both of the upper and lower latch mechanisms 60 and 62 in one motion. Upon moving the release actuator 112 upward, the seat shell 22 can be completely removed and detached from the base 24. In order to reinstall the seat shell 22 on the base 24, a user can place the seat shell over the base, actuator release actuator 112 to withdraw the upper and lower latch pins 116, 82. The seat shell 22 can then be positioned such that the upper and lower latch pins are aligned with the upper and lower latch brackets 160, 64. The release actuator 112 can then be released. The cable springs 148 will return the release actuator 112 to it's at rest position in the direction of the arrows RD in FIG. 11A. The upper and lower latch pins 116, 82 will then fire into the brackets, securing the seat shell 22 to the base 24.

In this example, the latch 80 is captured by portions 166 of the seat shell structure and can be molded in place, snapped in place, assembled in place, and/or held in place by one or more securing or fastening devices, clips, fasteners, or the like. Similarly, the upper and lower brackets 160, 64 can also be captured by portions of the base 22 and can also be molded in place, snapped in place, assembled in place, and/or held in place by fasteners or other securing devices as well.

The means by which the latch 80 and brackets 160, 64 are attached to the car seat 20 can vary within the spirit and scope of the present invention. As shown in FIG. 9, the upper and lower brackets can be connected by a pair of rails 168. The rails 168 can be separate from one another or can be part of an integrated rail and bracket framework. The rails 168 can also be molded in place, snapped in place, assembled in place, or otherwise held in place by fasteners or other securing devices. Also, the configuration and construction of both the upper and lower brackets 160, 64 and the latch 80 can vary as well. In one example, the inner wall 66 can be the one connecting the outer wall 68 to the brackets 64 and to the structure of the base 24. The recline detents can differ from the holes 72 described herein. In one example, a scalloped, downward-facing edge of the outer wall 68 can define a plurality of seats or notches that are open to the bottom, instead of being closed openings like the holes 72. Similarly, the recline tracks or slots 70 can be replaced by a downward facing edge of the inner wall 66 instead of being a closed slot. Other changes and variations to these components can also be made. The structure and function of the latch 80, including the latch pins can also vary.

The various latching components and methods can also vary within the spirit and scope of the invention. Devices other than latch pins can be used for both the latching function and the recline function. The motion transfer mechanisms can vary and the structure and means by which the latches engage can also vary. Hooks can be provided instead of the pins that rotate into and out of engagement with recline or release tracks when the recline or release handle is pulled or otherwise actuated. The hooks can be positioned on the sides of the seat back portion and can engage to stamped metal tracks, i.e., recline tracks, on the base. The hooks can be disengaged inwardly when the release handle or recline handle is pulled up. The release and recline handle can be configured as the same single handle or actuator. The actuators can be mounted to other locations on the car seat, on the seat shell, or the base.

The seat shell can be designed so that the pins or other engagement devices automatically snap or fire into the respective tracks or detents when the seat shell is placed on the base and pushed onto the base. This can eliminate the need to actuate the release handle during installation of the seat shell on the base.

In general, the seat shell 22 disclosed and described herein can be mounted to the base in only "One Click" making it easy and simple for a parent to install the car seat 20. In other embodiments, alternate engagement devices or latching mechanisms can be used and replace the disclosed upper and lower latching mechanisms.

In order to assure the user that the seat shell 22 is properly fixed to the base, an indicator could also be present at each connection point, i.e., latch mechanism connection point, to provide visual/auditory feedback to the user that the system is connected at all attachment points. An electronic or mechanical indicator can be used to assure the user that the seat shell is properly connected to the base. The electronic indicator may be preferred due to complexity in indicating four connection points at once. An electronic system could utilize a switch or an optical or conductive method at each connection point or latching location. The indication method could be visual (LED's) or audio (beeps/sounds). In order to preserve battery life, the indicator could be on a timer such that the LED/audio would turn off after a specified time, and turn back on only when the seat shell is either disconnected and/or reconnected, or if a "test" button was pushed.

An alternative indication method could be to mechanically connect all latching points to one indication system through a series of cables, linkages, wires, or the like. Alternatively, there could be a mechanical indicator at each connection point with a separate window at each point to determine if that point is secured and connected. The latching points would each have to indicate a connection and the user would need to view each window to determine whether the seat is connected.

Although the key benefit is derived from the vehicle seat belt version shown herein, the same "One Click" shell-to-base connection system could be used for an ISOFIX base as described above. The "One Click" concept could also be used with a base that accepts multiple seat shells, including both rear-facing and/or forward-facing seats.

It may be important, depending on the connection devices and mechanisms utilized, that the cables are rigid and fully constrained so that the cables can apply the forces needed to ramp each connection point out of engagement. It is possible that the same base could be used to fit a Group 0+ and/or a rear-facing Group 0+/Group 1 seat shell. This could allow complete modularity of a car seat system with ease of use and value for the money. The base could be installed once in a vehicle and then different seat shells could be clicked in and out as the child grows or to accommodate different children.

In addition to the many ways possible for providing indication of engagement, there are also many alternate methods and components that could be used to connect the shell to the base. The disclosed "One Click" system is better than traditional belt-routed seats because it allows complete access and visibility while installing the car seat. It also has the added benefit of allowing the user to purchase a base for each of their cars and easily and simply transfer the seat shell from car to car. This can result in additional cost savings for a user.

Although certain car seats, features, devices, mechanisms, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A child car seat comprising:
   a base for placement on a vehicle seat;
   a seat shell removably attachable to the base, the seat shell having a seat back portion and a seat bottom portion;
   an upper latch mechanism on a back side of the seat back portion and having an upper latch pin biased to protrude outward through a respective upper opening in the seat shell, the upper latch mechanism connecting the seat back portion to the base when engaged;
   a lower latch mechanism on an underside of the seat bottom portion and having a lower latch pin biased to protrude outward through a respective lower opening in the seat shell, the lower latch mechanism connecting the seat bottom portion to the base when engaged;
   a release actuator connected to each of the upper and lower latch mechanisms, one end of a release cable coupled to the release actuator and another end of the release cable coupled to the upper latch mechanism, and one end of a supplemental cable coupled to the release actuator and another end of the supplemental cable coupled to the lower latch mechanism;
   wherein actuation of the release actuator disengages both the upper latch mechanism and the lower latch mechanism whereby the upper latch pin is fully withdrawn from the respective upper opening in the seat shell and the lower latch pin is fully withdrawn from the respective lower opening in the seat shell releasing the seat shell for removal from the base.

2. A child car seat according to claim 1, wherein the release actuator has a handle positioned at a top end of the seat back portion on the seat shell.

3. A child car seat according to claim 1, wherein the upper latch mechanism includes a pair of upper latches laterally spaced apart on the back side of the seat back portion and a pair of the release cables each with one end coupled to the release actuator and another end coupled to a respective one of the pair of upper latches.

4. A child car seat according to claim 3, wherein each of the pair of upper latches includes one of the upper latch pins that are biased outward away from one another when engaged.

5. A child car seat according to claim 1, wherein the lower latch mechanism includes a pair of lower latches laterally spaced apart on the underside of the seat bottom portion and a pair of the supplemental cables each with one end coupled to the release actuator and another end coupled to a respective one of the pair of lower latches.

6. A child car seat according to claim 5, wherein each of the pair of lower latches includes one of the lower latch pins that are biased outward away from one another when engaged.

7. A child car seat according to claim 1, wherein the upper latch mechanism and the lower latch mechanism are operably connected to one another by the release actuator and by the supplemental cable extending from the release actuator to the lower latch mechanism.

8. A child car seat according to claim 1, further comprising a recline actuator that includes a recline cable connected to at least one latch mechanism of the upper and lower latch mechanisms and, wherein the recline actuator is operable to move the at least one latch mechanism to a recline arrangement, which partially withdraws the corresponding upper or lower latch pin from the respective upper or lower opening in the seat shell permitting adjustment of the seat shell between at least two different recline positions without disengaging the seat shell for removal from the base.

9. A child car seat according to claim 1, wherein the base has a shell mounting surface that includes one or more visible guides that indicate a belt path for routing a safety belt of a vehicle seat to secure the base to the vehicle seat.

10. A child car seat comprising:
    a base for placement on a vehicle seat;
    a seat shell attachable to and detachable from the base and adjustable on the base between a first and a second recline position, the seat shell having a seat back portion and a seat bottom portion;
    an upper latch mechanism having an upper latch pin biased to protrude outward through a respective upper opening in the seat shell, the upper latch mechanism attaching the seat back portion to the base in a latched arrangement;
    a lower latch mechanism having a lower latch pin biased to protrude outward through a respective lower opening in the seat shell, the lower latch mechanism attaching the seat bottom portion to the base in the latched arrangement;
    a release actuator on the car seat and connected to each of the upper and lower latch mechanisms; and
    a recline actuator on the car seat and connected to at least one latch mechanism of the upper and lower latch mechanisms,
    wherein actuation of the release actuator moves both the upper latch mechanism and the lower latch mechanism to a released arrangement detaching the seat shell for removal from the base, and
    wherein actuation of the recline actuator moves the at least one latch mechanism to a recline arrangement, but not the release arrangement, which partially withdraws the upper or lower latch pin from the respective upper or lower opening in the seat shell thereby allowing adjustment of the seat shell to a selected one of the first and second recline positions.

11. A child car seat according to claim 10, wherein the upper latch mechanism includes a pair of upper latches each having one of the upper latch pins biased laterally outward away from the other, each upper latch pin slidable vertically along a slot on the base when in the latched arrangement permitting adjustment of the recline position of the seat shell.

12. A child car seat according to claim 10, wherein the lower latch mechanism includes a pair of lower latches and a pair of recline cables each having one end coupled to the recline actuator and another end coupled to a respective one of the pair of lower latches, each of the pair of lower latches having a bracket spaced laterally apart from the other, each bracket having an inner wall, an outer wall spaced outward from the inner wall, an elongate track in the inner wall, and first and second recline detents in the outer wall aligned with the track and defining the first and second recline positions.

13. A child car seat according to claim 12, wherein each of the pair of lower latches has one of the lower latch pins that seats in one detent of the first or second recline detents in the corresponding bracket when in the latched arrangement, and wherein each lower latch pin is withdrawn from the one detent but seated in the respective track in the recline arrangement.

14. A child car seat according to claim 13, wherein each lower latch pin is withdrawn from both the one detent and the track in the released arrangement.

15. A child car seat according to claim 10, wherein the release actuator is operably coupled to the at least one latch mechanism by a release cable and wherein the recline actuator is operably coupled to the at least one latch mechanism by a recline cable.

16. A child car seat according to claim 10, wherein the release actuator and recline actuator are discrete actuators located at different locations on the seat shell.

17. A child car seat according to claim 10, wherein the release actuator is a handle positioned near a top end of the seat back portion on the seat shell and wherein the recline actuator is a handle positioned near a forward end of the seat bottom portion of the seat shell.

18. A child car seat according to claim 17, wherein the recline actuator, when actuated, moves the lower latch mechanism to the recline arrangement but does not move the upper latch mechanism from the latched arrangement, and wherein the upper latch mechanism in the latched arrangement permits adjustment of the seat shell between the first and second recline positions.

19. A child car seat comprising:
a base for placement on a vehicle seat;
a seat shell attachable to and detachable from the base and adjustable thereon between at least two different recline positions;
a latch mechanism having a latch pin biased to protrude outward through a respective opening in the seat shell, the latch mechanism on the car seat biased to a latched position attaching the seat shell to the base and retaining the seat shell in one of the different recline positions;
a release actuator on the car seat and connected to the latch mechanism; and
a recline actuator on the car seat and connected to the latch mechanism,
wherein actuating the release actuator moves the latch mechanism to a released arrangement, which fully withdraws the latch pin from the respective opening in the seat shell thereby detaching and permitting removal of the seat shell from the base, and
wherein actuating the recline actuator moves the latch mechanism to a recline arrangement, which partially withdraws the latch pin from the respective opening in the seat shell thereby allowing adjustment of the recline position of the seat shell but not permitting removal of the seat shell from the base.

20. A child car seat according to claim 19, wherein the release actuator and the recline actuator are two different actuators located at different locations on the seat shell.

* * * * *